(12) United States Patent
Kim et al.

(10) Patent No.: US 10,383,171 B2
(45) Date of Patent: *Aug. 13, 2019

(54) DIGITAL DATA TRANSMISSION IN DISTRIBUTED ANTENNA SYSTEM

(71) Applicant: SOLiD, INC., Seongnam-si, Gyeonggi-do (KR)

(72) Inventors: Hyoungho Kim, Seoul (KR); Doyoon Kim, Bucheon-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,331

(22) Filed: Dec. 20, 2017

(65) Prior Publication Data

US 2018/0116012 A1    Apr. 26, 2018

Related U.S. Application Data (63) Continuation of application No. 15/084,716, filed on Mar. 30, 2016, now Pat. No. 9,877,356, which is a continuation of application No. PCT/KR2015/014537, filed on Dec. 30, 2015.

(30) Foreign Application Priority Data

Dec. 30, 2014   (KR) .................... 10-2014-0194368

(51) Int. Cl.
*H04B 7/022*   (2017.01)
*H04W 88/08*   (2009.01)

(52) U.S. Cl.
CPC .......... *H04W 88/085* (2013.01); *H04B 7/022* (2013.01)

(58) Field of Classification Search
CPC ............................. H04W 88/085; H04B 7/022
See application file for complete search history.

(56) References Cited

U.S. PATENT DOCUMENTS

| | | | |
|---|---|---|---|
| 8,897,739 B1 * | 11/2014 | Mateski | H04W 4/90 455/404.1 |
| 2009/0290632 A1 | 11/2009 | Wegener | |
| 2010/0251364 A1 | 9/2010 | Lee et al. | |
| 2010/0278530 A1 | 11/2010 | Kummetz et al. | |
| 2011/0135013 A1 | 6/2011 | Wegener | |
| 2012/0057572 A1 | 3/2012 | Evans et al. | |
| 2012/0314797 A1 | 12/2012 | Kummetz et al. | |
| 2013/0136202 A1 | 5/2013 | Kummetz et al. | |

(Continued)

OTHER PUBLICATIONS

International Search Report issued in PCT/KR2015/014537 dated Dec. 30, 2015.

(Continued)

*Primary Examiner* — Sam K Ahn
*Assistant Examiner* — Amneet Singh
(74) *Attorney, Agent, or Firm* — Sughrue Mion, PLLC (57) ABSTRACT

A distributed antenna system (DAS) according to an aspect of the inventive concept includes a first node unit for receiving first digital data in accordance with a digital interface standard from a base station, converting the first digital data into second digital data in accordance with a DAS frame standard, and a second node unit for receiving the second digital data from the first node unit, and restoring the first digital data based on the second digital data.

13 Claims, 6 Drawing Sheets

(56) References Cited

U.S. PATENT DOCUMENTS

2015/0156284 A1   6/2015   Akhter

OTHER PUBLICATIONS

Office Action issued in parent U.S. Appl. No. 15/084,716 dated Jun. 15, 2016.
Written Opinion issued in PCT/KR2015/014537 dated May 2, 2016.
Final Office Action issued in parent U.S. Appl. No. 15/084,716 dated Mar. 17, 2017.
Notice of Allowance issued in parent U.S. Appl. No. 15/084,716 dated Sep. 20, 2017.

* cited by examiner

DIGITAL DATA TRANSMISSION IN DISTRIBUTED ANTENNA SYSTEM

CROSS REFERENCE TO RELATED APPLICATIONS

This application is a Continuation of U.S. application Ser. No. 15/084,716, filed on Mar. 30, 2016, which is a Continuation of PCT International Application No. PCT/KR2015/014537, filed Dec. 30, 2015, and claims priority from Korean Patent Application No. 10-2014-0194368 filed Dec. 30, 2014, the contents of which are incorporated herein by reference in their entireties.

BACKGROUND

1. Field

The inventive concept relates to a distributed antenna system (DAS), and more particularly, to a digital data transmission in a DAS.

2. Description of Related Art

When a distributed antenna system (DAS) interfaces with a base station through a digital interface standard, e.g., a common public radio interface (CPRI), an open baseband remote radiohead interface (OBSAI), an open radio interface (ORI), etc., if the DAS follows the interface standard of the base station as it is such that data received from the base station is transmitted from a head-end unit to a hub unit or remote unit in the DAS, the transmission capacity of data increases.

In the digital interface standard such as the CPRI, the OBSAI, or the ORI, a large amount of overhead is included in a transmitted data frame, and therefore, the transmission efficiency of data is low in actual payload transmission. Accordingly, there is required a method capable of efficiently transmitting signals transmitted according to the digital interface standard in a signal distributed system such as a DAS, which should transmit wideband signals.

In the digital interface standard such as the CPRI, the OBSAI, or the ORI, the sampling rate with respect to bandwidth (BW) is high. Also, stuffing bits are added to a payload portion corresponding to user data, and therefore, the number of bits in data transmission increases. In addition, the transmission efficiency with respect to the BW is lowered due to line coding such as 8B10B. In a DAS network, a plurality of digital interfaces should be employed so as to support a plurality of bands, providers, sectors, MIMO, etc., the transmission efficiency of data is lowered. Therefore, the transmission efficiency of data is low in the actual payload transmission, and hence the transmission capacity of data increases when the data is transmitted as it is.

Accordingly, there is required a transmission method capable of reducing an overhead of data in the digital interface standard by considering the transmission efficiency and transmission capacity of data in the DAS which should transmit wideband signals.

SUMMARY

An embodiment of the inventive concept is directed to a digital data transmission capable of reducing transmission capacity and improving transmission efficiency in a distributed antenna system.

According to an aspect of the inventive concept, there is a provided a distributed antenna system (DAS), comprising: a first node unit configured to receive first digital data in accordance with a digital interface standard from a base station, convert the first digital data into second digital data in accordance with a DAS frame standard; and a second node unit configured to receive the second digital data from the first node unit, and restore the first digital data based on the second digital data.

According to an exemplary embodiment, wherein the digital interface standard may be any one of a common public radio interface (CPRI), an open baseband remote radiohead interface (OBSAI), and an open radio interface (ORI).

According to an exemplary embodiment, wherein the first node unit may include: a first payload extractor configured to extract payload data corresponding to user data from the first digital data; a first resampler configured to perform resampling on the payload data, extracted by the first payload extractor, at a frame rate in accordance with the DAS frame standard; and a first framer configured to generate the second digital data by performing framing-process on the payload data, resampled by the first resampler, in accordance with the DAS frame standard.

According to an exemplary embodiment, wherein the first framer of the first node unit may include an first overhead processor configured to determine overhead data corresponding to control & management (C&M) data and synchronization data from the first digital data, and convert the overhead data in accordance with the digital interface standard into overhead data in accordance with the DAS frame standard.

According to an exemplary embodiment, wherein the second node unit may include: a second payload extractor configured to extract the payload data corresponding to user data from the second digital data; a second resampler configured to perform resampling on the payload data, extracted by the second payload extractor, at a frame rate in accordance with the digital interface standard; and a second framer configured to restore the first digital data by performing framing-process on the payload data, resampled by the second resampler, in accordance with the digital interface standard.

According to an exemplary embodiment, wherein the second framer of the second node unit may include a data restorer configured to determine overhead data corresponding to C&M data and synchronization data from the second digital data, and convert the overhead data in accordance with the DAS frame standard into overhead data in accordance with the digital interface standard.

According to an exemplary embodiment, wherein the second node unit may be configured to receive a third digital data in accordance with the digital interface standard, transmitted along an uplink signal transmission path, convert the third digital data into fourth digital data in accordance with the DAS frame standard, and transmit the fourth digital data to the first node unit, and wherein the first node unit may be configured to receive the fourth digital data from the second node unit, and restore the third digital data based on the fourth digital data.

According to an exemplary embodiment, wherein the second node unit may include: a third payload extractor configured to extract payload data corresponding to user data from third digital data; a third resampler configured to perform resampling on the payload data, extracted by the third payload extractor, at a frame rate in accordance with the DAS frame standard; and a third framer configured to generate the fourth digital data by performing framing-process on the payload data, resampled by the third resampler, in accordance with the DAS frame standard.

According to an exemplary embodiment, wherein the third framer of the second node unit may include an overhead processor configured to determine overhead data corresponding to C&M data and synchronization data from the third digital data, and convert the overhead data in accordance with the digital interface standard into overhead data in accordance with the DAS frame standard.

According to an exemplary embodiment, wherein the first node unit may include: a fourth payload extractor configured to extract the payload data corresponding to user data from the fourth digital data; a fourth resampler configured to perform sampling on the payload data, extracted by the fourth payload extractor, at the frame rate in accordance with the digital interface standard; and a fourth framer configured to restore the third digital signal by performing framing-process on the payload data, resampled by the fourth resampler, in accordance with the digital interface standard.

According to an exemplary embodiment, wherein the fourth framer of the first node unit may include a data restorer configured to determine overhead data corresponding to C&M data and synchronization data from the fourth digital data, and convert the overhead data in accordance with the DAS frame standard into overhead data in accordance with the digital interface standard.

In the digital data transmission method according to the inventive concept, it is possible to reduce transmission capacity and improve transmission efficiency in a distributed antenna system.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

Hereinafter, a distributed antenna system (DAS) will be mainly described as an application example to which embodiments of the inventive concept are applicable. However, the embodiments of the inventive concept are identically or similarly applicable to other signal distributed transmission systems such as a base transceiver station distributed antenna system, as well as the DAS.

Figure 1:
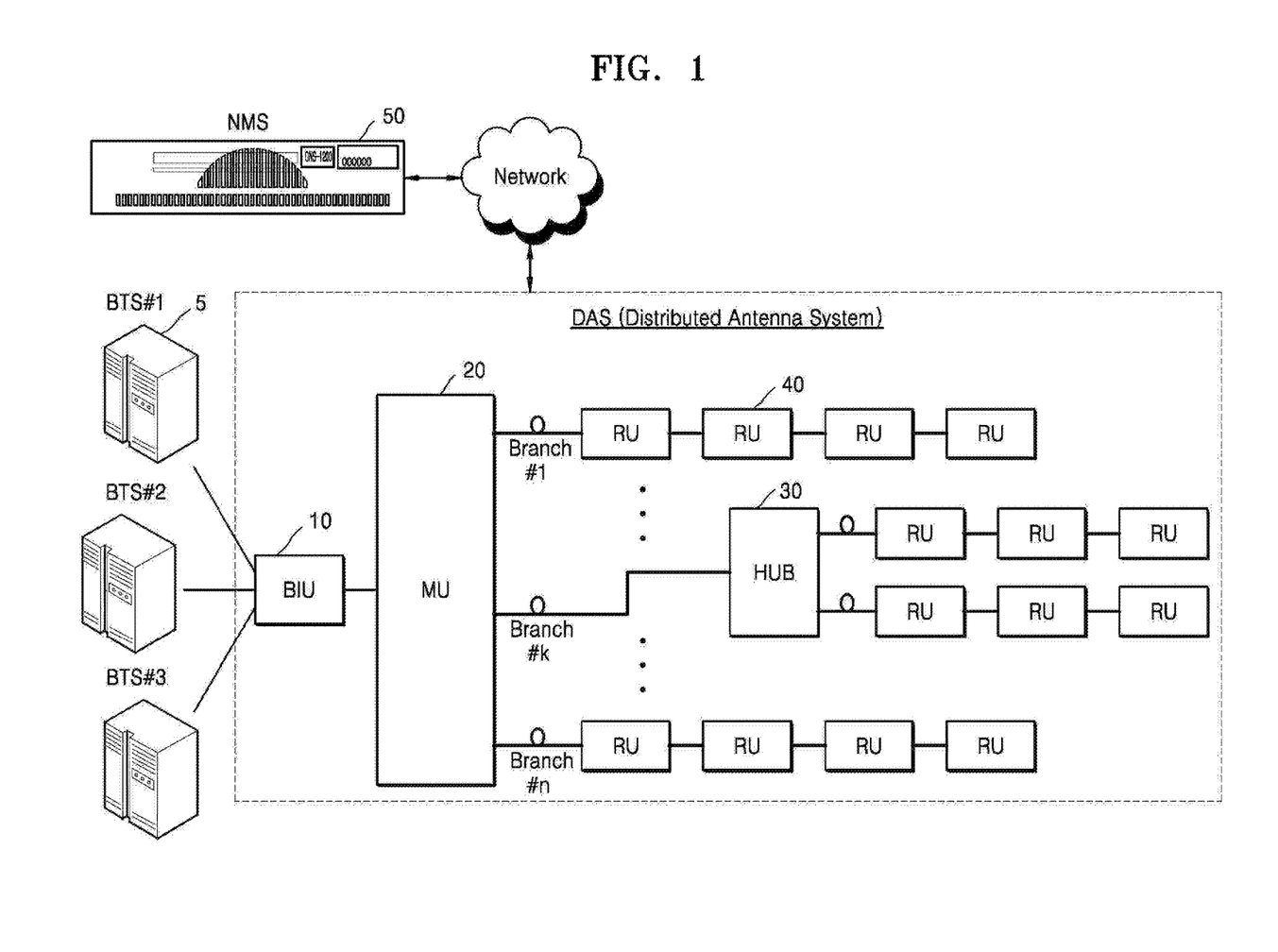
FIG. 1 is a diagram illustrating an example of a topology of a distributed antenna system (DAS) as one form of a signal distributed transmission system to which the inventive concept is applicable.

FIG. 1 is a diagram illustrating an example of a topology of a DAS as one form of a signal distributed transmission system to which the inventive concept is applicable.

Referring to FIG. 1, the DAS may include a base station interface unit (BIU) 10 and a main unit (MU) 20, which constitute a head-end node of the DAS, a hub unit (HUB) 30 serving as an extension node, and a plurality of remote units (RUs) 40 respectively disposed at remote service positions. The DAS may be implemented as an analog DAS or a digital DAS. When necessary, the DAS may be implemented as a hybrid of the analog DAS and the digital DAS (e.g., to perform analog processing on some nodes and digital processing on the other nodes).

However, FIG. 1 illustrates an example of the topology of the DAS 100, and the DAS 100 may have various topologies in consideration of particularity of its installation areas and application fields (e.g., in-building, subway, hospital, stadium, etc.). In view of the above, the number of the BIU 10, the MU 20, the HUB 30, and the RUs 40 and connection relations between upper and lower nodes among the BIU 10, the MU 20, the HUB 30, and the RUs 40 may be different from those of FIG. 1. In the DAS, the HUB 30 may be used when the number of branches to be branched in a star structure from the MU 20 is limited as compared with the number of RUs 40 required to be installed. Therefore, the HUB 30 may be omitted when only the single MU 20 sufficiently covers the number of RUs 40 required to be installed, when a plurality of MUs 20 are installed, or the like.

Hereinafter, nodes in the DAS applicable to the inventive concept and their functions will be sequentially described based on the topology of FIG. 1.

The BIU 10 serves as an interface between a base station transceiver system (BTS) 5 and the MU 20. Although a case where a plurality of BTSs 5 are connected to the single BIU 10 is illustrated in FIG. 1, the BIU 10 may be separately provided for each provider, each frequency band, or each sector.

In general, a radio frequency (RF) signal transmitted from the BTS 5 is a signal of high power. Hence, the BIU 10 converts the RF signal of high power into a signal with power suitable to be processed in the MU 20 and transmits the converted signal to the MU 20. According to an embodiment, the BIU 20, as shown in FIG. 1, may receive mobile communication signals for each frequency band (or each provider or each sector), combine the received signals, and then transmit the combined signal to the MU 20.

When the BIU 10 converts mobile communication signals of high power, transmitted from the BTS 5, into mobile communication signals of low power, combines the mobile communication signals, and then transmits the combined mobile communication signal to the MU 20, the MU 20 may distribute the combined and transmitted mobile communication signal (hereinafter, referred to as the relay signal) for each branch. In this case, when the DAS is implemented as the digital DAS, the BIU 10 may be separated into a unit for converting RF signals of high power, transmitted from the BTS 5, into RF signals of low power, and a unit for performing digital signal processing on RF signals of low power and combining the processed digital signals. In the digital signal processing on the RF signals, the RF signals may be directly converted into digital signals, or may be converted into intermediate frequency (IF) signals or baseband signals and then converted into digital signals. Hereinafter, for convenience of illustration, a case where the BIU 10 converts RF signals into IF signals and then performs digital signal processing will be mainly described.

Alternatively, when the BIU 10 performs only the function of converting the relay signals of high power, transmitted from the BTS 5, into the relay signals of low power, the MU 20 may combine the transmitted relay signals and distribute the combined relay signal for each branch.

As described above, the combined relay signal distributed from the MU 20 may be transmitted to the RUs 40 through the HUB 30 or directly transmitted to the RUs 40, for each branch (see Branch #1, . . . , Branch #k, . . . , Branch #N of FIG. 1). Each RU 40 may separate the transmitted combined relay signal for each frequency band and perform signal processing (analog signal processing in the analog DAS and digital signal processing in the digital DAS). Accordingly, each RU 40 can transmit relay signals to user terminals in its own service coverage through a service antenna. Specific components and functions of the RU 40 will be described in detail below with reference to FIG. 2.

In FIG. 1, it is illustrated that the BTS 5 and the BIU 10 are connected through an RF cable, the BIU 10 and the MU 20 are connected through an RF cable, and all nodes from the MU 20 to lower nodes thereof are connected through optical cables. However, a signal transport medium between nodes may be variously modified. As an example, the BIU 10 and the MU 20 may be connected through an RF cable, but may be connected through an optical cable or a digital interface. As another example, the MU 20 and HUB 30 may be connected through an optical cable, the MU 20 and the RU 40 directly connected thereto may be connected through an optical cable, and the cascade-connected RUs 40 may be connected through an RF cable, a twist cable, a UTP cable, etc. As still another example, the MU 20 and the RU 40 directly connected thereto may also be connected through an RF cable, a twist cable, a UTP cable, etc.

Hereinafter, this will be described based on FIG. 1. Therefore, in this embodiment, each of the MU 20, the HUB 30, and the RUs 40 may include an optical transceiver module for electrical-to-optical (E/O) conversion/optical-to-electrical (O/E) conversion. When node units are connected through a single optical cable, each of the MU 20, the HUB 30, and the RUs 40 may include a wavelength division multiplexing (WDM) element. This will be clearly understood through functions of the RU 40 in FIG. 2, which will be described later.

The DAS may be connected to an external management device (a network management server or system (NMS) 50 of FIG. 1). Accordingly, a manager can remotely monitor states and problems of the nodes in the DAS through the NMS 50, and can remotely control operations of the nodes in the DAS through the NMS 50.

Figure 2:
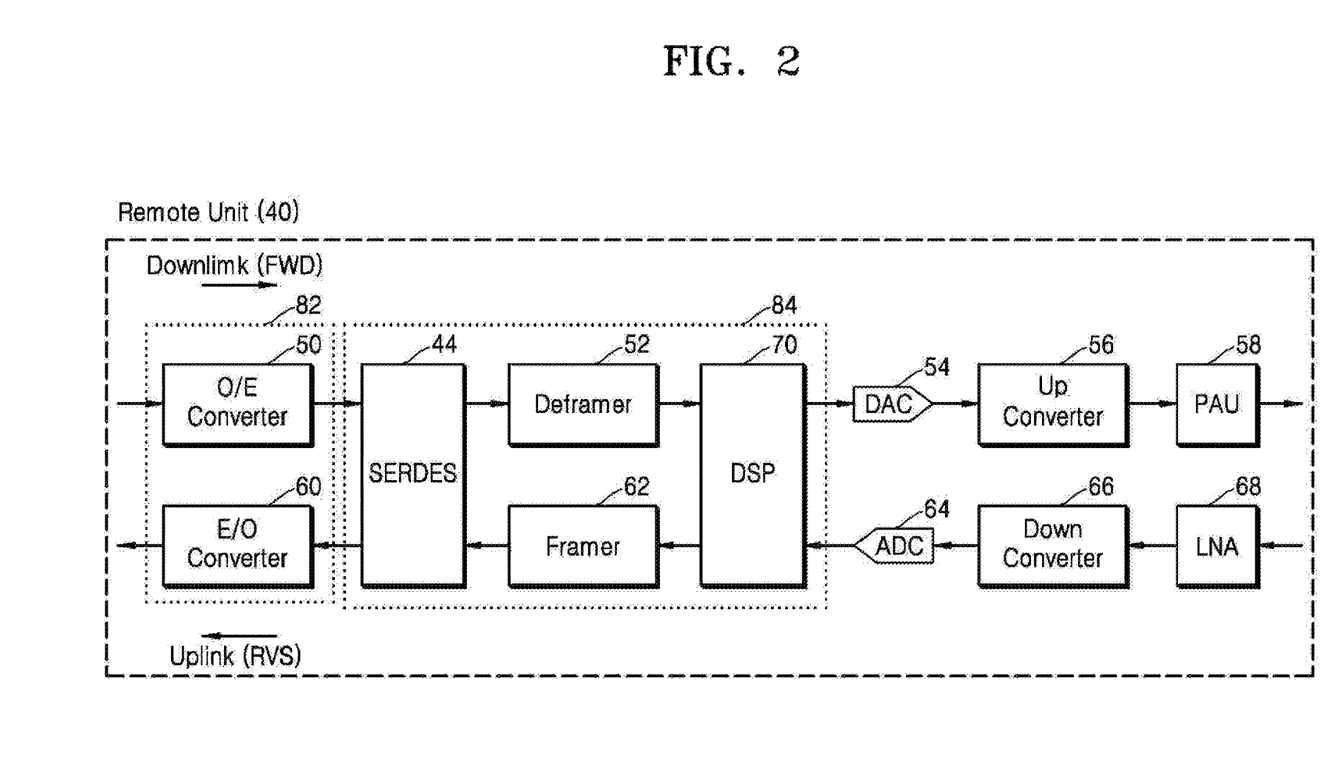
FIG. 2 is a block diagram illustrating an embodiment of a remote unit in the DAS to which the inventive concept is applicable.

FIG. 2 is a block diagram illustrating an embodiment of the RU in the DAS to which the inventive concept is applicable.

Here, the block diagram of FIG. 2 illustrates an embodiment of the RU 40 in the digital DAS in which nodes are connected through an optical cable. In addition, the block diagram of FIG. 2 illustrates only components related to a function of providing service signals to terminals in service coverage through a forward path and processing terminal signals received from the terminals in the service coverage through a reverse path.

Referring to FIG. 2, with respect to a downlink signal transmission path (i.e., a forward path), the RU 40 includes an optical-to-electrical (O/E) converter 50, a serializer/deserializer (SERDES) 44, a deframer 52, a digital signal processor (DSP) 70, a digital-to-analog converter (DAC) 54, an up converter 56, and a power amplification unit (PAU) 58.

In the forward path, an optical relay signal digital-transmitted through an optical cable may be converted into an electrical signal (serial digital signal) by the O/E converter 50. The serial digital signal may be converted into a parallel digital signal by the SERDES 44. The parallel digital signal may be reformatted by the deframer 52. The DSP 70 performs functions including digital signal processing, digital filtering, gain control, digital multiplexing, etc. on relay signals for each frequency band. The digital signal passing through the DSP 70 is converted into an analog signal through the DAC 54 posterior to a digital part 84, based on the signal transmission path. In this case, when the converted analog signal is an IF signal or baseband signal, the analog signal may be frequency up-converted into an analog signal in the original RF band through the up converter 56. The converted analog signal (i.e., the RF signal) in the original RF band is amplified through the PAU 58 to be transmitted through a service antenna (not shown).

With respect to an uplink signal transmission path (i.e., a reverse path), the RU 40 includes a low noise amplifier (LNA) 68, a down converter 66, an analog-to-digital converter ADC 64, the DSP 70, a framer 62, the SERDES 44, and an electrical-to-optical (E/O) converter 60.

In the reverse path, an RF signal (i.e., a terminal signal) received through the service antenna (not shown) from a user terminal (not shown) in a service coverage may be low-noise amplified by the LNA 68. The low-noise amplified signal may be frequency down-converted into an IF signal by the down converter 66. The converted IF signal may be converted into a digital signal by the ADC 64 to be transmitted to the DSP 70. The digital signal passing through the DSP 70 is formatted in a format suitable for digital transmission through the framer 62. The formatted digital signal is converted into a serial digital signal by the SERDES 44. The serial digital signal is converted into an optical digital signal by the E/O converter 60 to be transmitted to an upper node through an optical cable.

Although not clearly shown in FIG. 2, in the state in which the RUs 40 are cascade-connected to each other as illustrated in FIG. 1, the following method may be used when a relay signal transmitted from an upper node is transmitted to a lower adjacent RU cascade-connected to the upper node. For example, when an optical relay signal digital-transmitted from an upper node unit is transmitted to a lower adjacent RU cascade-connected to the upper node unit, the optical relay signal digital-transmitted from the upper node unit may be transmitted to the adjacent RU in an order of the O/E converter 50→the SERDES 44→the deframer 52→the framer 62→the SERDES 44→the E/O converter 60. This will be clearly understood through FIG. 3 which will be described later.

In FIG. 2, the SERDES 44, the deframer 52, the framer 62, and the DSP 70 may be implemented as a field programmable gate array (FPGA). In FIG. 2, it is illustrated that the SERDES 44 and the DSP 70 are commonly used in the downlink and uplink signal transmission paths. However, the SERDES 44 and the DSP 70 may be separately provided for each path. In FIG. 2, it is illustrated that the O/E converter 50 and the E/O converter 60 are provided separately from each other. However, the O/E converter 50 and the E/O converter 60 may be implemented as a single optical transceiver module (e.g., a single small form factor pluggable (SFP) (see reference numeral 82 of FIG. 2)).

Figure 3:
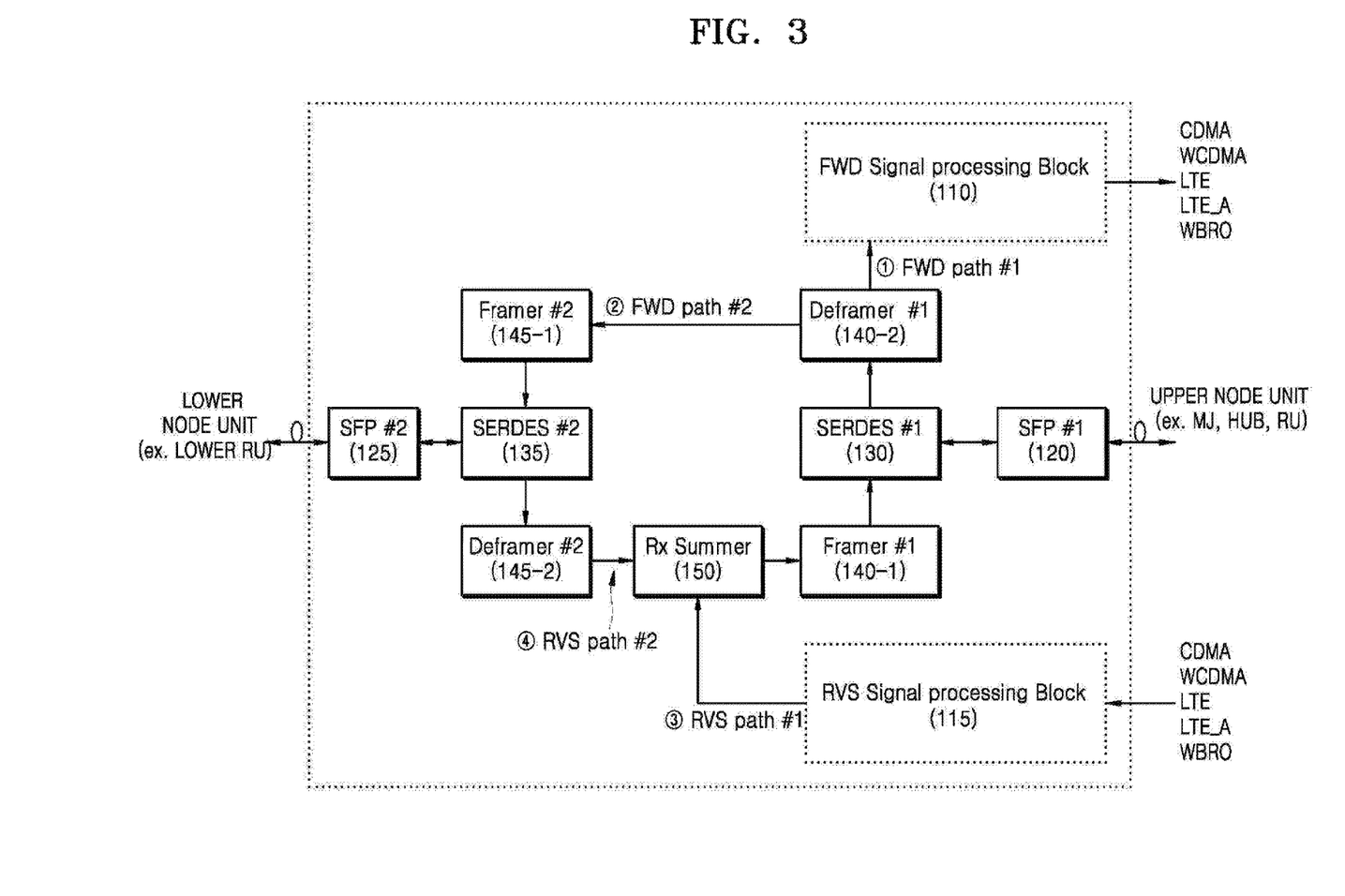
FIG. 3 is a block diagram illustrating examples of general signal transmission paths of a specific node unit with upper and lower node units in the DAS to which the inventive concept is applicable.

FIG. 3 is a block diagram illustrating examples of general signal transmission paths of a specific node unit with upper and lower node units in the DAS to which the inventive concept is applicable.

In FIG. 2, the components related to the path for transmitting or receiving signals through the service antenna and their functions have been described. On the other hand, FIG. 3 illustrates components related to a path for transmitting/receiving signals to/from an upper node unit or transmitting/receiving signals to/from a lower node unit and their functions are mainly described in FIG. 3. Here, a case where the node unit of FIG. 3 is an RU in the DAS (see FIG. 1) will be described as an example. In FIG. 3, it is assumed that the node unit is connected to each of the upper and lower node units through an optical cable. However, the transport medium used in connection between the nodes may vary as described in FIG. 1. When the optical cable is not used, an SFP #1 120 and an SFP #2 125 of FIG. 3 may be omitted. Hereinafter, a forward path refers to a forward signal transmission path, and a reverse path refers to a reverse signal transmission path.

In FIG. 3, a forward path #1 is a signal transmission path through which a mobile communication signal transmitted from an upper node of the corresponding RU is provided to a terminal in service coverage through a service antenna (not shown). Thus, the forward path #1 of FIG. 3 is substantially identical to the forward path of FIG. 2. In the forward path #1, a mobile communication signal digital-transmitted from the upper node through a transport medium (in this example, an optical line) is optical-to-electrical converted through the SFP #1 120. The converted signal is converted into a parallel digital signal through an SERDES #1 130. The converted signal is reformatted through a deframer #1 140-2 and then input to a forward signal processing block 110. The forward signal processing block 110 processes the transmitted digital signal and then converts the processed signal into an RF signal in the original frequency band corresponding to each mobile communication protocol, to be transmitted to the terminal in the service coverage through the service antenna (not shown).

Figure 4:
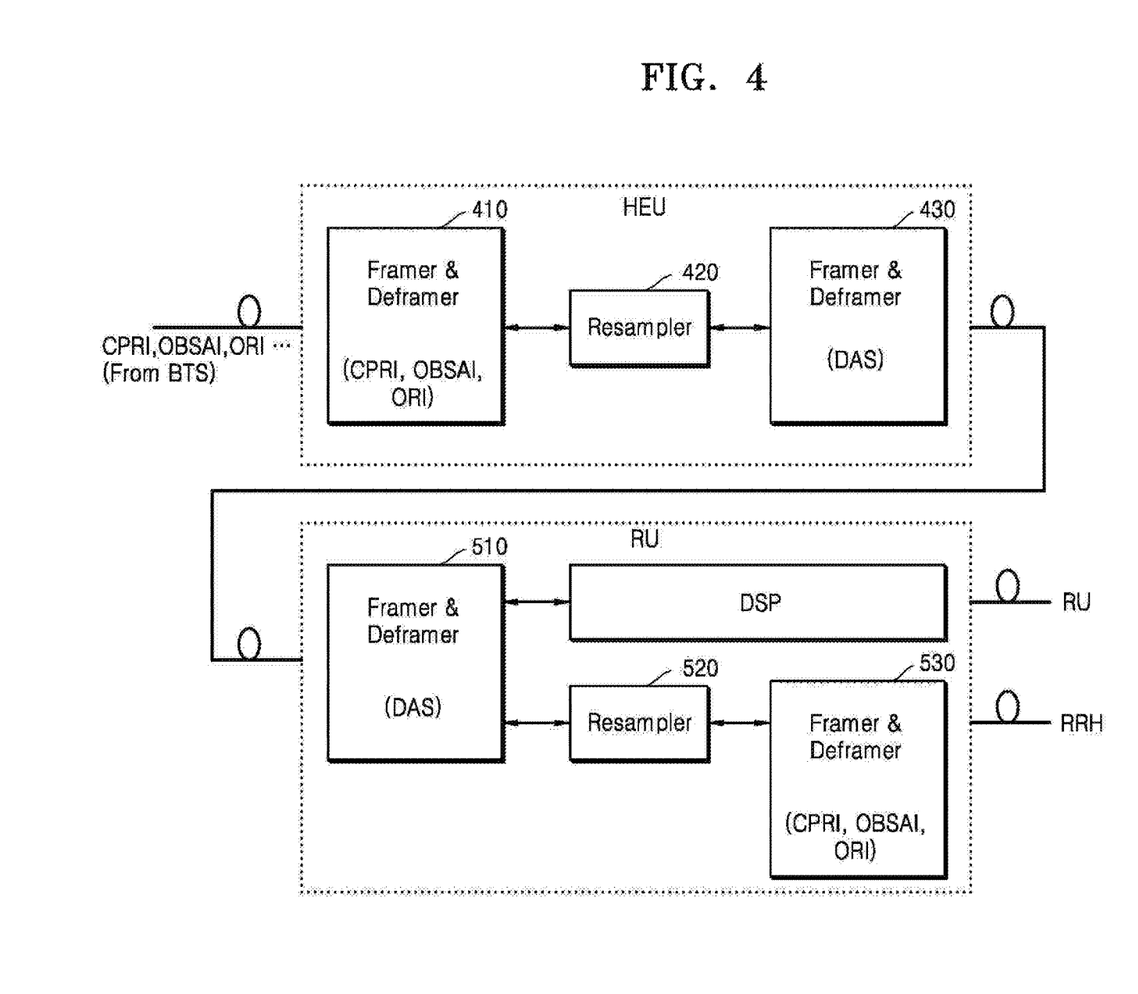
FIG. 4 is a diagram schematically illustrating a digital data transmission according to an embodiment of the inventive concept.

In this case, when there exists a lower adjacent RU connected (i.e., cascade-connected) to the corresponding RU, the mobile communication signal digital-transmitted from the upper node may be transmitted to a lower node through a forward path #2 of FIG. 4. The forward path #2 is a signal transmission path through which the mobile communication signal digital-transmitted from the upper node is transmitted to a lower node unit (e.g., a lower RU) through the transport medium via the SFP #1 120, the SERDES #1 130, the deframer #1 140-2, a framer #2 145-1, a SERDES #2 135, and the SFP #125.

In FIG. 3, a reverse path #1 is a signal transmission path through which a mobile communication signal received from the terminal in the service coverage through the service antenna (not shown) of the corresponding RU is transmitted to an upper node (finally transmitted to a base station). Thus, the reverse path #1 of FIG. 3 is substantially identical to the reverse path of FIG. 2. In the reverse path #1, the mobile communication signal received through the service antenna (not shown) is subjected to low noise amplification, frequency down-conversion, digital conversion, digital signal processing, etc. through a reverse signal processing block 115 and then input to a reverse signal combiner (Rx summer) 150. However, when the corresponding RU is a branch termination node, the digital signal passing through the reverse signal processing block 115 may be immediately input to the framer #1 140-1.

The Rx summer 150 combines the digital signal input through the reverse path #1 and a digital signal input through a reverse path #2. Here, the reverse path #2 of FIG. 3 is a signal transmission path through which, when there exists another lower RU connected to the corresponding RU, a reverse digital signal transmitted from the lower RU is transmitted. A mobile communication signal that is an optical digital signal transmitted from the lower RU is optical-to-electrical converted by the SFP #2 125 to be input to the Rx summer 150 via the SERDES #2 135 and a deframer #2 145-2.

The reverse digital signal, which is signal-combined by the Rx summer 150, is transmitted to the upper node through the transport medium via the framer #1 140-1, the SERDES #1 130, and the SFP #1 120. The reverse digital signal is finally transmitted to the base station.

In the above, the forward signal transmission case where an RF signal received from the BTS is transmitted to the lower RU in the DAS and the reverse signal transmission case where an RF signal received from the user terminal is transmitted to the BTS through the DAS have been described with reference to FIGS. 1 to 3.

Hereinafter, a digital data transmission method according to an embodiment of the inventive concept, based on a case where a forward or reverse signal in the DAS is processed when signals according to a digital interface standard are received from the BTS or a remote radio head (RRH), will be described with reference to FIGS. 4 to 5.

FIG. 4 is a diagram schematically illustrating a digital data transmission according to an embodiment of the inventive concept. FIG. 5 is a block diagram illustrating the digital data transmission based on a forward signal path in FIG. 4 according the embodiment of the inventive concept. FIG. 6 is a block diagram illustrating the digital data transmission based on a reverse signal path in FIG. 4 according the embodiment of the inventive concept.

Referring to FIG. 4, there is disclosed a DAS including a head-end unit (HEU) connected to a base station through a transport medium and a remote unit (RU) as a lower node unit connected to the HEU through a transport medium.

Although the RU is illustrated as a lower node unit, it will be apparent that a digital data method in the RU, which will be described below, may be identically or similarly applied to the HUB. In addition, the HEU may be connected to a plurality of BTSs. However, in FIG. 4, it is assumed that, for convenience illustration, the HEU is connected to one BTS, and the HEU receives signals according to a digital interface standard through the corresponding BTS.

The HEU receives, from the base station, digital data according to the digital interface standard. Here, the digital interface standard may be at least one of a common public radio interface (CPRI), an open baseband remote radiohead interface (OBSAI), and an open radio interface (ORI).

In the embodiment of the inventive concept, when digital data according to the digital interface standard is received, the data according to the digital interface standard is converted into data according to a DAS frame standard and transmits the converted data so as to improve transmission efficiency in digital data transmission in the DAS. To this end, the HEU may include a base-station-side framer/deframer 410, a resampler 420, and an RU-side framer/deframer 430. The RU as a lower node may include an HEU-side framer/deframer 510, a resampler 520, and a lower-node-side framer/deframer 530. In FIG. 4, the RU may further include a digital signal processing part (DSP). However, the DSP of the RU has described in detail through the description of FIG. 2, and therefore, overlapping description will be omitted.

Figure 5:
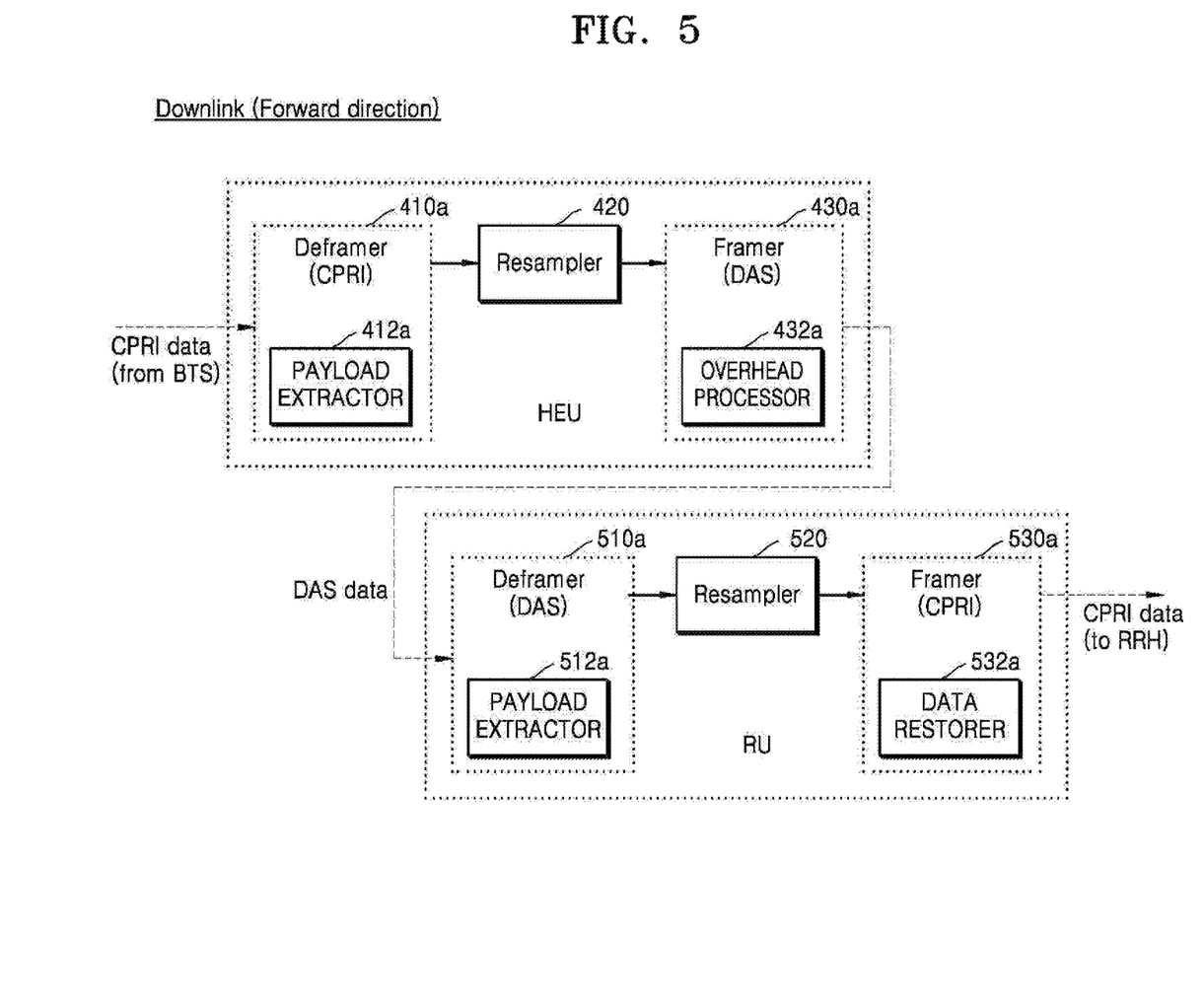
FIG. 5 is a block diagram illustrating the digital data transmission with respect to a forward signal path in FIG. 4 according the embodiment of the inventive concept.
Figure 6:
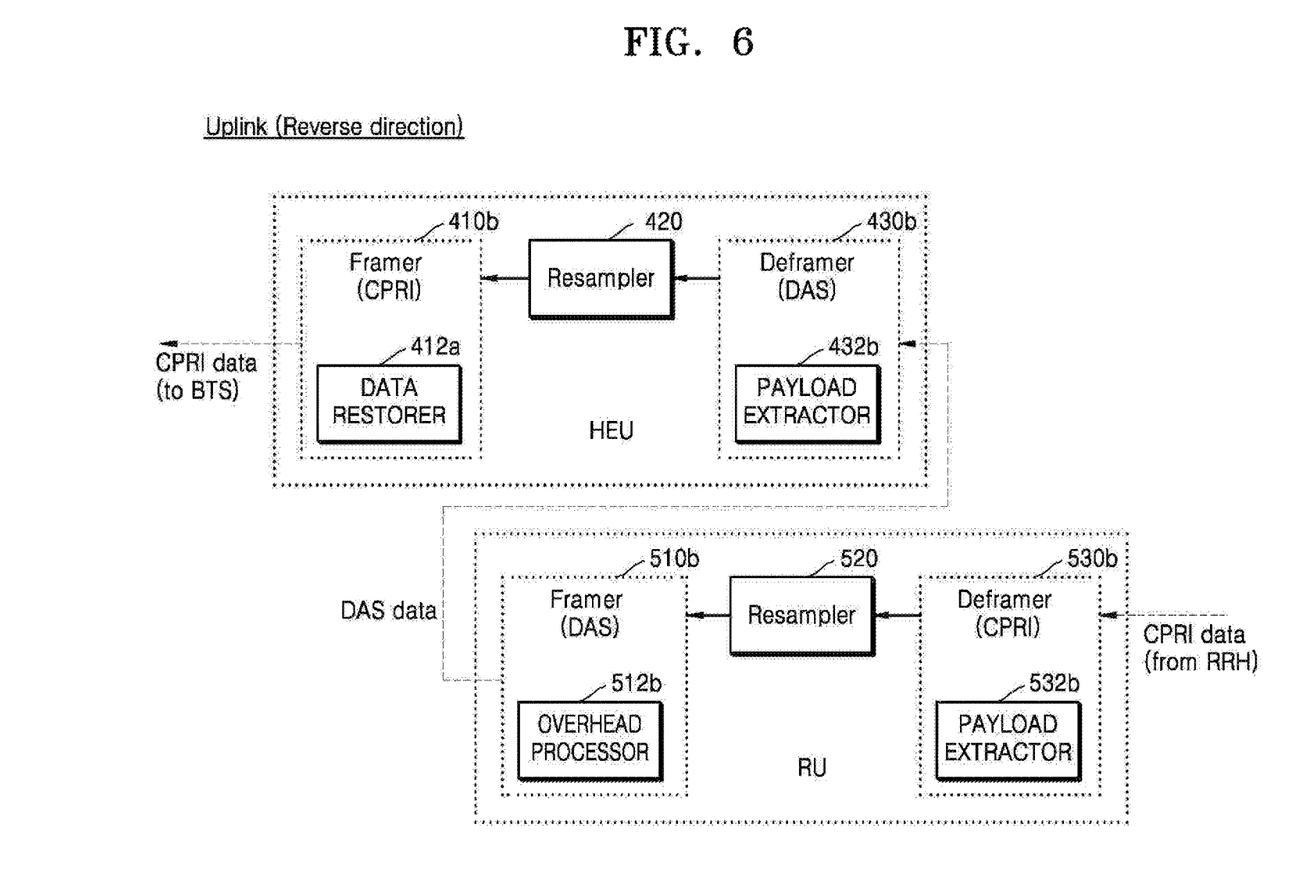
FIG. 6 is a block diagram illustrating the digital data transmission with respect to a reverse signal path in FIG. 4 according the embodiment of the inventive concept.

In FIGS. 5 and 6, it is assumed that, for convenience of illustration, CPRI data is used as data according to the digital interface standard. Therefore, FIGS. 5 and 6 will be described based on this assumption.

First, referring to FIG. 5, the HEU deframes CPRI data as data according to the digital interface standard, received from the base station, through a base-station-side deframer 410a, and the deframed digital data is converted into digital data with a frame rate according to a frame standard used in the DAS (hereinafter, referred to as a DAS frame standard) through a resampling process using the resampler 420. The digital data converted suitable for the DAS frame rate is again deframed through an RU-side framer 430a to be transmitted to the RU as a lower node unit through a transport medium.

The reason why the HEU resamples the digital data according to the digital interface standard to be suitable for the DAS frame rate is as follows. In the digital interface standard such as the CPRI, the OBSAI, or the ORI, the sampling rate with respect to bandwidth (BW) is high. Also, stuffing bits are added to a payload portion corresponding to user data, and therefore, the number of bits in data transmission increases. In addition, the transmission efficiency with respect to the BW is lowered due to line coding such as 8B10B. In a DAS network, a plurality of digital interfaces should be employed so as to support a plurality of bands, providers, sectors, MIMO, etc., the transmission efficiency of data is lowered. Therefore, the transmission efficiency of data is low in the actual payload transmission, and hence the transmission capacity of data increases when the data is transmitted as it is.

Accordingly, in the embodiment of the inventive concept, it is required to reduce an overhead in data according to the digital interface standard, convert the data according to the digital interface standard into data with the DAS frame rate through a resampling process, and then transmit the converted data to a lower node. Here, the overhead is data added except user data (i.e., a payload), and refers to control & management (C&M) data and synchronization data.

To this end, a payload extractor 412a may be included in the base-station-side deframer 410a of the HEU. Here, the payload extractor 412a extracts payload data corresponding to the user data from the data according to the digital interface standard, received from the base station. Accordingly, the resampler 420 can perform resampling at the DAS frame rate, based on the digital data output from the payload extractor 412a. The digital data resampled by the resampler 420 may be framed by the framer 430a according to the DAS frame standard. In this case, an overhead processor 432a may be included in the framer 430a. Here, the overhead processor 432a may extract overhead data corresponding to the C&M data and the synchronization data from the data according to the digital interface standard, received from the base station, and convert the overhead data according to the digital interface standard into overhead data according to the DAS frame standard.

In the above, the case where the payload extractor 412a and the overhead processor 432a are respectively implemented in the base-station-side deframer 410a and the RU-side framer 430a has been described as an example. However, it will be apparent that the payload extractor 412a and the overhead processor 432a may be implemented separately from the base-station-side deframer 410a and the RU-side framer 430a. This is identically applied in the case of similar components which will be described below.

If the digital data converted at the frame rate according to the DAS frame standard is transmitted to the RU through the transport medium in this manner, the RU restores the received DAS digital data to digital data with the frame rate according to the original digital interface standard.

Referring back to FIG. 5, when DAS digital data is received from the HEU, the RU deframes the DAS digital data through an HEU-side deframer 510a, and the deframed digital data is converted into digital data with the frame rate according to the original digital interface standard through a resampling process using the resampler 520. The converted digital data is again framed through a lower-node-side framer 530a to be transmitted to the RRH through a transport medium.

To this end, a payload extractor 512a may be included in the HEU-side deframer 510a of the RU. Here, the payload extractor 512a extracts payload data corresponding to the user data from the DAS digital data received from the HEU. Accordingly, the resampler 520 can perform resampling at the frame rate according to the digital interface standard, based on digital data output from the payload extractor 512a. The digital data resampled by the resampler 520 may be framed by the framer 530a according to the digital interface standard. In this case, a data restorer 532a may be included in the framer 530a. Here, the data restorer 532a may extract overhead data corresponding to the C&M data and the synchronization data from the DAS digital data received from the HEU, and re-generate (restore) the overhead data according to the digital interface standard, based on the overhead data according to the DAS frame standard.

In the above, the digital data mapping method and the digital data transmission method based on a forward signal transmission case have been described with reference to FIG. 5. Hereinafter, a reverse signal transmission case will be described with reference to FIG. 6.

Referring to FIG. 6, the RU may receive data according to the digital interface standard along an uplink signal transmission path from the RRH, convert the received data according to the digital interface standard into DAS digital data with the frame rate according to the DAS frame standard, and transmit the converted DAS digital data to the HEU. In this case, the HEU may receive DAS digital data from the RU, and restore the receive DAS digital data to data with the frame rate according to the digital interface standard.

More specifically, the RU deframes CPRI data as data according to the digital interface standard, received along the uplink signal transmission path, through a lower-node-side deframer 530b, and the deframed digital data is converted into digital data with the DAS frame rate through a resampling process using the resampler 520. The digital data converted to be suitable for the DAS frame rate is again framed through a HEU-side framer 510b to be transmitted to the HEU through a transport medium.

To this end, a payload extractor 532b may be included in the lower-node-side deframer 530b of the RU. Here, the payload extractor 532b extracts payload data corresponding to the user data from the received data according to the digital interface standard. Accordingly, the resampler 520 can perform resampling at the DAS frame rate, based on digital data output from the payload extractor 532b. The digital data resampled by the resampler 520 may be framed by the framer 510b according to the DAS frame standard. In this case, an overhead processor 512b may be included in the framer 510b. Here, the overhead processor 512b may extract overhead data corresponding to the C&M data and the synchronization data from the received data according to the digital interface standard, and convert the overhead data according to the digital interface standard into overhead data according to the DAS frame standard.

If the digital data converted at the frame rate according to the DAS frame standard is transmitted to the HEU through the transport medium in this manner, the HEU restores the received DAS digital data to digital data with the frame rate according to the original digital interface standard.

Referring back to FIG. 6, when DAS digital data is received from the RU, the HEU deframes the DAS digital data through an RU-side deframer 430b, and the deframed digital data is converted into digital data with the frame rate according to the original digital interface standard through a resampling process using the resampler 420. The digital data converted to be suitable for the frame rate according to the digital interface standard is again framed through a base-side framer 410b to be transmitted to the base station through a transport medium.

To this end, a payload extractor 432b may be included in the RU-side deframer 430b of the HEU. Here, the payload extractor 432b extracts payload data corresponding to the user data from the DAS digital data received from the RU. Accordingly, the resampler 420 can perform resampling at the frame rate according to the digital interface standard, based on digital data output from the payload extractor 432b. The digital data resampled by the resampler 420 may be framed by the base-station-side framer 410b according to the digital interface standard to be transmitted to the base station through the transport medium. In this case, a data restorer 412b may be included in the framer 410b. Here, the data restorer 412b may extract overhead data corresponding to the C&M data and the synchronization data from the DAS digital data received from the RU, and re-generate (restore) the overhead data according to the digital interface standard, based on the overhead data according to the DAS frame standard.

In the above, only the case where data according to the digital interface standard is transmitted from the RRH through the reverse signal transmission path has been described. However, a reverse signal received from the RU as described in FIG. 2 and a reverse signal received from the lower RU cascade-connected to the RU as described in FIG. 3 may also be transmitted through the reverse signal transmission path. In this case, it may be required to sum up a reverse signal received from the RU or/and a reverse signal received from the lower RU and a reverse signal according to the digital interface standard, received from the RRH. In this case, a signal summer (not shown) for digitally summing the reverse signals after digital signal processing on each of the reverse signals is performed may be further included in the RU. This may be similarly applied to the case of the HEU. That is, reverse signals are input for each branch from a plurality of lower RUs, a signal summer (not shown) for digitally summing a plurality of reverse signals may be further included in the HEU.

In the above, the case where after resampling processing is performed, digital signals are immediately input to the framer or deframer has been mainly described. However, it will be apparent that, according to a system design method, a DSP may be additionally provided before or after the resampling processing is performed.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A distributed antenna system (DAS), comprising:
   a first node unit comprising at least one first processor configured to receive first digital data in accordance with a digital interface standard from a base station, convert the first digital data into second digital data by resampling the first digital data or a portion of the first digital data at a frame rate in accordance with a DAS frame standard that applies to the DAS and by performing a framing process on the first digital data or the portion of the first digital data resampled in accordance with the DAS frame standard; and
   a second node unit comprising at least one second processor configured to receive the second digital data which is framed in the DAS frame standard from the first node unit, and restore the first digital data based on the second digital data,
   wherein the at least one first processor of the first node unit is further configured to convert overhead data included in the first digital data in accordance with the digital interface standard into overhead data in accordance with the DAS frame standard.

2. The DAS of claim 1, wherein the digital interface standard is a common public radio interface (CPRI), an open baseband remote radiohead interface (OBSAI), or an open radio interface (ORI).

3. The DAS of claim 2, wherein the at least one first processor of the first node unit is further configured to:
   extract first payload data corresponding to user data from the first digital data;
   perform resampling on the first payload data at the frame rate in accordance with the DAS frame standard; and
   generate the second digital data by performing the framing process on the first payload data in accordance with the DAS frame standard.

4. The DAS of claim 3, wherein the at least one first processor of the first node unit is further configured to determine the overhead data corresponding to control & management (C&M) data and synchronization data from the first digital data, and convert the overhead data in accordance with the digital interface standard into the overhead data in accordance with the DAS frame standard.

5. The DAS of claim 3, wherein the at least one second processor of the second node unit is further configured to:
extract the first payload data corresponding to the user data from the second digital data;
generate second payload data by performing resampling on the first payload data at the frame rate in accordance with the digital interface standard; and
restore the first digital data by performing a framing process on the second payload data in accordance with the digital interface standard.

6. The DAS of claim 5, wherein the at least one second processor of the second node unit is further configured to determine overhead data corresponding to C&M data and synchronization data from the second digital data, and convert the overhead data in accordance with the DAS frame standard into overhead data in accordance with the digital interface standard.

7. The DAS of claim 1, wherein the at least one second processor of the second node unit is further configured to receive third digital data, which is transmitted along an uplink signal transmission path, in accordance with the digital interface standard, convert the third digital data into fourth digital data in accordance with the DAS frame standard, and transmit the fourth digital data to the first node unit, and
wherein the at least one first processor of the first node unit is further configured to receive the fourth digital data from the second node unit, and restore the third digital data based on the fourth digital data.

8. The DAS of claim 7, wherein the at least one second processor of the second node unit is further configured to:
extract third payload data corresponding to user data from the third digital data;
generate fourth payload data by performing resampling on the third payload data at the frame rate in accordance with the DAS frame standard; and
generate the fourth digital data by performing a framing process on the fourth payload data in accordance with the DAS frame standard.

9. The DAS of claim 8, wherein the at least one second processor of the second node unit is further configured to determine overhead data corresponding to C&M data and synchronization data from the third digital data, and convert the overhead data in accordance with the digital interface standard into overhead data in accordance with the DAS frame standard.

10. The DAS of claim 8, wherein the at least one first processor of the first node unit is further configured to:
extract the fourth payload data corresponding to user data from the fourth digital data;
perform resampling on the fourth payload data at the frame rate in accordance with the digital interface standard; and
restore the third digital data by performing a framing process on the fourth payload data in accordance with the digital interface standard.

11. The DAS of claim 10, wherein the at least one first processor of the first node unit is further configured to determine overhead data corresponding to C&M data and synchronization data from the fourth digital data, and convert the overhead data in accordance with the DAS frame standard into overhead data in accordance with the digital interface standard.

12. A communication device, comprising:
at least one memory; and
at least one processor to implement:
a resampler configured to receive first digital data in accordance with a digital interface standard from a base station, and resampling the first digital data or a portion of the first digital data at a frame rate in accordance with a distributed antenna system (DAS) frame standard that applies to the DAS;
a framer configured to generate second digital data by performing a framing process on the first digital data or the portion of the first digital data resampled in accordance with the DAS frame standard; and
an overhead processor configured to convert overhead data included in the first digital data in accordance with the digital interface standard into overhead data in accordance with the DAS frame standard.

13. A communication device, comprising:
at least one memory; and
at least one processor to implement:
a resampler configured to receive first digital data in accordance with a digital interface standard from a base station, and resampling the first digital data or a portion of the first digital data at a frame rate in accordance with a distributed antenna system (DAS) frame standard that applies to the DAS;
a framer configured to generate second digital data by performing a framing process on the first digital data or the portion of the first digital data resampled in accordance with the DAS frame standard; and
an overhead processor configured to reduce overhead data included in the first digital data in accordance with the digital interface standard, based on the DAS frame standard.

* * * * *